C. M. AGNEW.
ELECTRIC WELDING MACHINE AND PROCESS.
APPLICATION FILED AUG. 22, 1913.
1,315,939.
Patented Sept. 16, 1919.
3 SHEETS—SHEET 3.
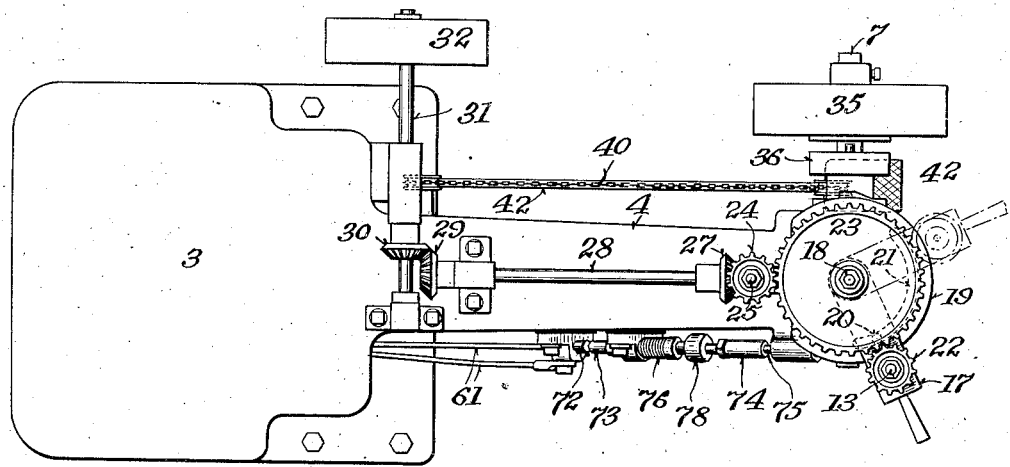
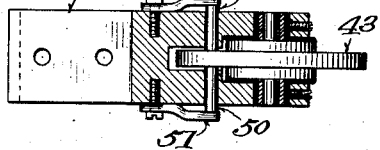
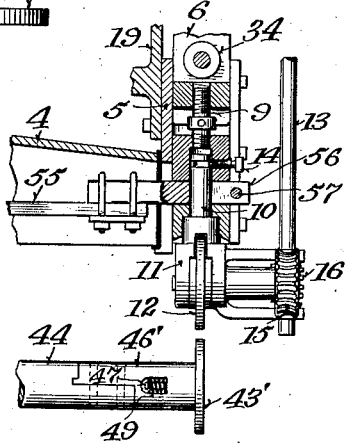
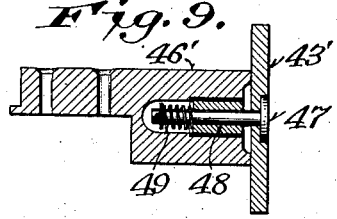
Witnesses:
Fred Palm
Chas. L. Goss
Inventor:
Clair M. Agnew
By Flanders Bettman Fawcett Bettman
Attorneys.

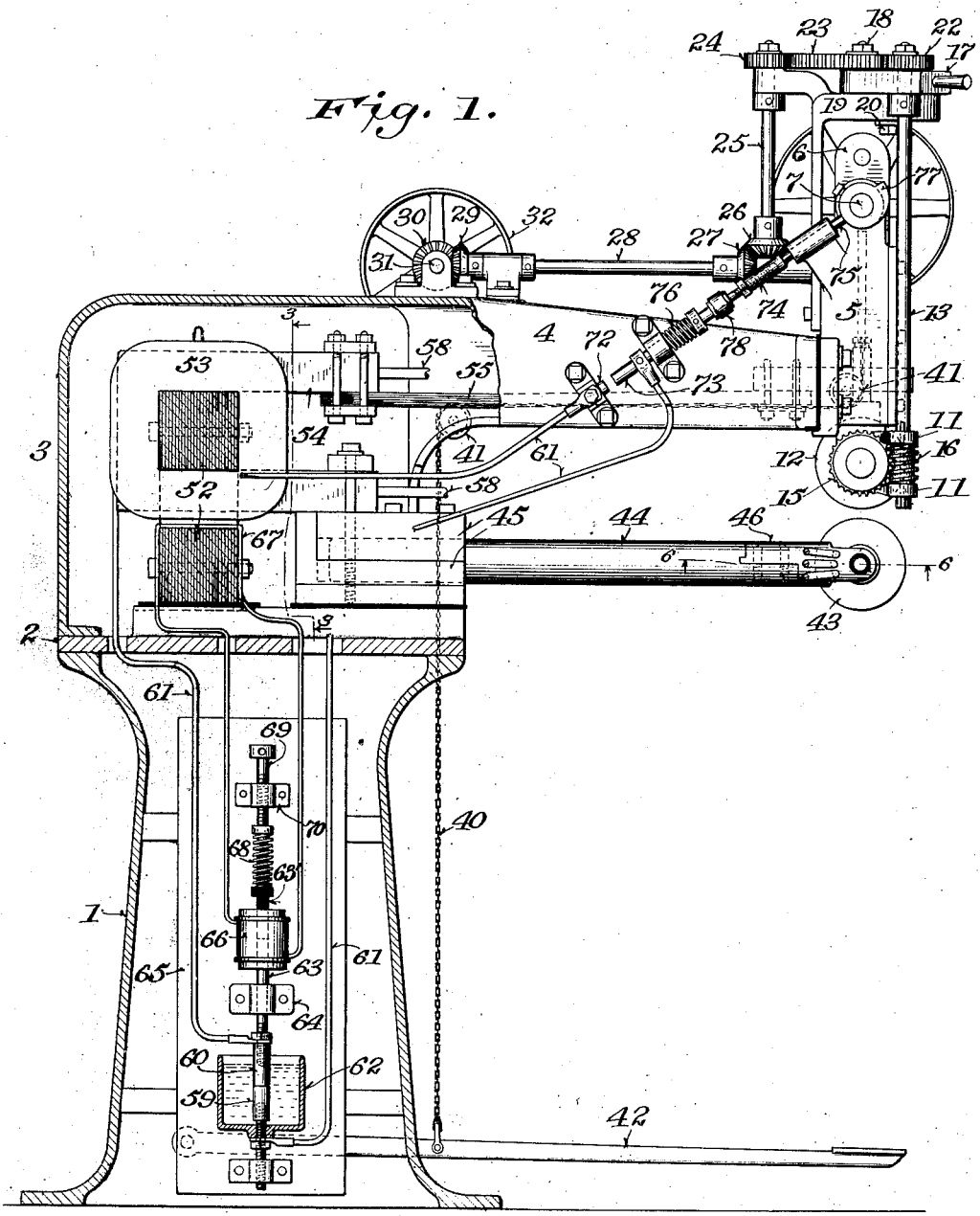

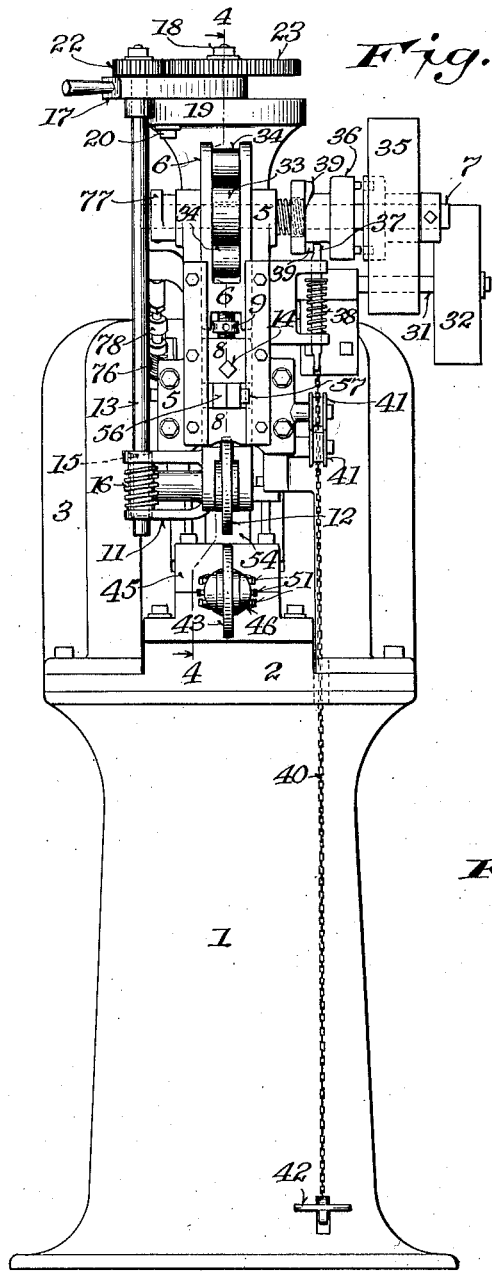

UNITED STATES PATENT OFFICE.

CLAIR M. AGNEW, OF MILWAUKEE, WISCONSIN.

ELECTRIC-WELDING MACHINE AND PROCESS.

1,315,939.   Specification of Letters Patent.   Patented Sept. 16, 1919.

Application filed August 22, 1913. Serial No. 786,055.

*To all whom it may concern:*

Be it known that I, CLAIR M. AGNEW, a citizen of the United States, residing at Milwaukee, in the county of Milwaukee and State of Wisconsin, have invented certain new and useful Improvements in Electric-Welding Machines and Processes, of which the following is a specification, reference being had to the accompanying drawing, forming a part thereof.

This invention relates more particularly to electric resistance line or seam welding of sheet metal, and its main objects are to continuously and rapidly form a strong, uniform and smooth seam weld without sweating, buckling, wrinkling, blistering, burning or pitting, and to improve the construction and operation of machines for this purpose.

It consists in the process and in the construction, arrangement and combination of parts of a machine for performing the process as hereinafter particularly described and pointed out in the claims.

In seam welding thin sheet metal it has been found difficult to continuously produce a strong smooth weld. With a current of sufficient strength to effect a perfect weld the metal is apt to be burned, pitted or injured if the current is continuously applied while the parts to be united are subjected to a welding pressure, and on the other hand, if a continuous current of such strength as will not injuriously affect the metal is employed, an effective and satisfactory weld or union cannot be made, the adjoining surfaces of the metal being at best merely sweated or insecurely stuck together. I have discovered that by rapidly breaking and closing the circuit or interrupting the current while the pieces to be united are subjected to pressure and are progressively moved between the electrodes, a smooth, uniform and continuous seam weld can be easily, rapidly and effectively made without burning, roughening, distorting or otherwise injuring the metal, and upon the principle involved in this discovery have devised the process and apparatus which constitute the present invention.

In the accompanying drawing showing a machine embodying the above mentioned principle, like characters designate the same parts in the several figures.

Figure 1 is a side elevation of the machine, a portion of the frame being broken away to disclose interior parts; Fig. 2 is a front elevation of the machine; Fig. 3 is a vertical section on the line 3—3, Fig. 1, showing the transformer with its auxiliary secondary coil for operating the automatic current interrupter; Fig. 4 is a vertical section on the line 4—4, Fig. 2, showing the rotary electrodes and associated parts of the machine; Fig. 5 is a plan view of the machine; Fig. 6 is an enlarged section on the line 6—6, Fig. 1, showing the lower rotary electrode; Fig. 7 is a view partly in elevation and partly in section, showing a modification of the automatic current interrupter shown in Fig. 1; Fig. 8 is a vertical section similar to Fig. 4, showing rotary electrodes set in a vertical plane at right angles to that in which they are shown in Fig. 1, for feeding the work crosswise instead of lengthwise of the overhanging electrode supporting arms; and Fig. 9 is an enlarged vertical axial section of the lower removable electrode for feeding work transversely to its supporting arm.

The frame of the machine as preferably constructed, comprises a hollow pedestal or base 1, surmounted by a bed plate 2, and a hollow top section or casing 3, having a horizontally projecting hollow arm 4 on the front side. The arm 4 is provided at its overhanging front end with a head 5 bolted thereto and insulated therefrom, as shown in Figs. 1 and 4. The head 5 is formed or provided with guideways for a vertically movable slide 6, and at its upper end with bearings for a transverse shaft 7. With the lower end of the slide 6, a swivel block 8 also guided in said ways, is adjustably connected by a right and left screw 9. In a vertical bore of the swivel block, which is made in two parts or sections, is fitted to turn the shouldered cylindrical stem 10 of a frame 11, which is formed or provided with alined horizontal bearings for a rotary disk electrode 12, and with vertically alined bearings for a shaft 13. The stem 10 is secured in the swivel block, and the sections of said block are held together by a set screw 14 threaded in the upper section of the block and engaging with a groove in the stem, as shown in Fig. 4. The short shaft on which the rotary electrode 12 is fixed, is provided at one end with a worm gear 15, which meshes with a worm 16, feathered on the shaft 13. The shaft 13 has a bearing adjacent to its upper end in a horizontally swinging arm 17, pivoted on a stud 18, projecting in axial alinement with the stem 10 from a bracket or extension 19 on the head 5, as shown in Figs. 1, 2 and 5. The arm 17 is fastened in adjusted position by a set screw 20 threaded therein and passing downwardly through a curved slot 21 in the bracket 19, as shown in Figs. 2, 4 and 5. At its upper end the shaft 13 is provided with a pinion 22 meshing with a spur gear 23, which is journaled on the stud 18. The gear 23 meshes on its rear side with a pinion 24 on the upper end of a vertical shaft 25 having bearings projecting rearwardly from the bracket 19, as shown in Figs. 1, 4 and 5. The shaft 25 is provided at its lower end with a bevel gear 26, meshing with a similar gear 27 on a horizontal shaft 28, having bearings on the bracket 19 and the arm 4 respectively. At its rear end the shaft 28 is provided with a bevel gear 29, meshing with a similar gear 30 on a transverse shaft 31, having bearings on the arm 4 or top section 3 of the frame, and provided with a pulley 32.

The shaft 7 is provided, as shown in Figs. 2 and 4, with an eccentric 33, working with rollers 34 journaled above and below it in the slide 6. A driving pulley 35, loosely mounted on the shaft 7, is operatively connected therewith by a spring actuated clutch 36, as shown in Figs. 2 and 5. The clutch is released to turn the shaft 7 and depress the electrode 12, and is automatically disengaged from the driving pulley 35 at the end of each half revolution thereof, by a sliding bolt 37, which is normally held by a spring 38 in engagement with one of two diametrically opposite inclined lugs 39 on the hub of the clutch. The bolt 37 is connected by a chain or cable 40 passing around guide sheaves 41, with a foot lever 42 fulcrumed in the lower part of the pedestal 1 and projecting forwardly therefrom.

As shown in Figs. 1 and 2, a rotary disk electrode 43 is mounted directly below the electrode 12 on the front end of a cylindrical supporting arm 44, which is adjustably clamped at its rear end between blocks 45, and bolted therewith to the bed plate 2, the blocks 45 being insulated from the bed plate.

As shown in Figs. 1, 4 and 6, the rotary electrode 43 is journaled in a forked cylindrical head 46, of the same diameter as the arm 44, to which it is detachably fastened by a rabbet joint and countersunk screws, the vertical plane of rotation of the electrode when attached, as stated, to said arm, being central and lengthwise thereof and in the plane of the upper electrode 12, as shown in Fig. 2.

For welding articles which are longer than the arm 44, or which can be more conveniently fed between the electrodes crosswise than lengthwise of said arm, the machine is provided, as shown in Figs. 8 and 9, with a lower electrode 43', rotatably connected with the outer end of a cylindrical head 46' corresponding in shape with the head 46 and adapted to be detachably fastened in like manner to the front end of the arm 44.

To insure and maintain good electrical contact between the disk 43' and the head 46', and to prevent burning and injuring the rotating connection between the disk and head by the passage of the current therethrough, the end of the head next to the disk is recessed as shown in Fig. 9, and the disk is rotatably connected with the head by a journal pin 47, passing through an insulated bushing 48, fitted in an axial bore of the head and provided between the inner end of the bushing and a washer fastened on the inner end of the journal pin, with a spring 49, which draws and holds the disk tightly against the recessed end of the head through which current passes to the disk.

To insure a good electrical connection between the disk 43 and the head 46, and prevent burning and injuring the journals and journal bearings of the disk by the passage of the current therethrough, the journal bearings are insulated and a number of contact pins 50, loosely fitted in transverse holes in the head, are pressed and held at their inner ends against opposite faces of the disk, by spring conductor clips 51, fastened by screws to the head, as shown in Figs. 1 and 6.

In the top section or case 3 of the frame, a transformer is inclosed, comprising, as shown in Figs. 1 and 3, an annular or four-limbed laminated metal core 52, two primary coils 53 surrounding the upper leg of the core, and a secondary conductor having a hollow U-shaped metal section 54, embracing the upper limb of the core between the primary coils 53. The lower limb of the section 54 is clamped to the blocks 45, through which it is electrically connected with the arm 44, carrying the lower electrode. A flexible laminated conductor 55, is clamped at its rear end to the upper limb of the section 54, as shown in Fig. 1, and at its front end, as shown in Fig. 4, to a forked coupling 56, which is clamped by a bolt 57 on the swivel stem 10 of the upper electrode between the upper and lower sections of the swivel block 8. To avoid overheating, the section 54 of the transformer is provided at its ends with water supply and outlet connections 58, as shown in Fig. 1.

An automatic interrupter for momentarily breaking the welding circuit and interrupting the welding current at frequent predetermined intervals, is inclosed in the pedestal 1 of the frame, as shown in Fig.

1. This interrupter may consist as shown, of normally closed or engaging contact pieces 59 and 60, connected in series in the primary circuit 61 of the transformer and immersed in water or other liquid which is a partial conductor contained in a receptacle 62, and offers more or less resistance to the passage of current between the contact pieces when they are separated. The contact piece 60 is attached to a stem 63 of soft iron or magnetic metal, guided in a bearing 64 on an insulating base 65, and is movable toward and from the opposing stationary contact piece 59. The stem 63 passes loosely into a solenoid magnet coil 66, which is connected with an extra secondary coil 67, wound on the lower leg of the transformer core 52. The movable contact piece 60 is held normally in engagement with the contact piece 59 by a spring 68, interposed between an insulating piece 63' inserted in the magnet coil and bearing on the stem 63 and an adjusting screw 69, threaded in line with said stem in a bracket 70 on the base 65. The primary circuit of the transformer is also provided with an automatic controller for closing the circuit when the welding electrodes are brought together against the work, and to break the circuit when the electrodes are separated. This controller consists, as shown in Figs. 1 and 5, of contact pieces 72 and 73, mounted on one side of the arm 4 and insulated therefrom. The contact piece 73, which is movable into and out of engagement with the contact piece 72, is adjustably connected by a sleeve nut 74 with a rod 75, guided in a bearing on the head 5 and held by a spring 76, which normally separates the contact pieces, in engagement with a cam 77 on the shaft 7. The stem of the movable contact piece 73 is made in sections, which are connected by an insulating joint 78.

Instead of operating the interrupter electrically by a connection with the transformer, as shown in Fig. 1, it may be operated by a mechanical device, such as a cam 79 driven from any convenient part of the machine or other source of power, and cooperating with a collar or wiper 80 on the stem of the movable contact piece 60, as shown in Fig. 7.

In the operation of the machine, with the rotary electrodes set in a plane lengthwise of the arm 44 for welding tubular or other hollow articles, the work is placed between the electrodes 12 and 43, in position to start a seam weld. The foot lever 42 is then depressed by the operator, releasing the clutch 36, which is thrown by its spring into engagement with the driving pulley 35. The shaft 7 with the cam 33 being turned a half revolution, forces the upper electrode 12 downward against the work on the lower electrode 43. As the electrodes are thus closed or brought together against the work, the circuit 61 is closed by the cam 77 thrusting the contact piece 73 against the contact piece 72. Current passing through the primary coils 53, induces in the secondary of the transformer the requisite welding current, which passing through the electrodes heats the work while subjected to pressure between them, to a welding temperature. Current passing through the primary coils 53 of the transformer, induces a current in the coil 67 and energizes the solenoid 66, which pulls the contact piece 60 out of engagement with the contact piece 59, thereby permitting water to flow between them and interpose resistance in the primary circuit, and for an instant interrupting or materially reducing the induced welding current passing through the electrodes and the work held between them. This interruption or reduction of the current or its variation between a real value and a higher value or between maximum and minimum values prevents burning or overheating and injuring the work after it is brought to a welding temperature, and while the contiguous parts are being united by the pressure to which the work is subjected between the electrodes. The primary circuit and the induced current in the coil 67 being thus interrupted, the solenoid 66 is deënergized, and the contact piece 60 is forced by the spring 68 back into engagement with the contact piece 59, thereby restoring the primary circuit through the coils 53 to its normal condition and again inducing a welding current in the secondary of the transformer.

These operations are repeated in rapid succession as long as the electrodes 12 and 43 are held together against the work and the primary circuit is kept closed by the engagement of the contact piece 73 with the contact piece 72.

The water or other partial conductor liquid contained in the receptacle 62 prevents burning and injuring the contact pieces 59 and 60 which would result from the successive and rapid breaking and closing of the primary circuit if a non-conducting liquid such as oil was used.

Power being applied to the pulley 32, operates through the gearing hereinbefore described, including the worm gear 15 and worm 16, to turn the upper disk electrode 12, which while it is held against the work, operates as a tractor to continuously feed the work between the electrodes. The welding current being interrupted at predetermined intervals of great frequency, say from one to two thousand times per minute, and the interruptions being very short as compared with the rate of feed of the work between the electrodes, a continuous and uniform seam weld is progressively and uninterruptedly formed, and a perfect union of the parts is obtained without burning, pitting or otherwise injuring the metal adjoining the weld.

When the weld is finished, the operator depresses the foot lever 42, thereby releasing the clutch 36, which is again thrown by its spring into engagement with the continuously rotated driving pulley 35. The shaft 7 with the eccentric 33 is turned a half revolution, lifting the upper electrode 12 out of operative position, as shown in Fig. 4, the foot lever being released immediately after its depression, so that the trip bolt 37 will engage with the next lug 39, shifting the clutch out of engagement with the driving pulley and stopping the driving shaft with the eccentric 33 and the cam 77 in their normal positions, as shown in Figs. 1 and 4.

For welding long articles, or such as can not be conveniently placed over the arm 44, the rotary electrodes are set in a plane at right angles to the arms 4 and 44, as shown in Fig. 8. This is accomplished by substituting for the lower electrode 43 and its head 46, the electrode 43' with its corresponding head 46', and by turning the arm 17 from the position in which it is shown by full lines into the position indicated by dotted lines in Fig. 5, the set screw 20 and the clamping bolt 57 being loosened to permit of the latter adjustment.

The operation of the automatic cam actuated interrupter shown in Fig. 7, so far as its effect on the welding current and the operation of welding is concerned, is the same as that of the electrically actuated interrupter shown in Fig. 1.

The upper electrode 12 is adjusted relative to the lower electrode 43 or 43' and the eccentric 33 by the screw 9 for welding metals of different thicknesses and for exerting the requisite pressure for welding metals of different characteristics.

The term "interrupter" as herein used is intended to include any device for repeatedly breaking or interposing more or less resistance in the circuit which supplies or induces the welding current thereby intermittently cutting off completely or reducing more or less the strength of the current at very short intervals and hence the term "interrupting" as applied to the current, is intended to include intermittently reducing the strength of the current as well as completely arresting it intermittently.

Various changes in the details of construction and arrangement of parts of the machine other than those hereinbefore mentioned may be made without essentially affecting the operation of the machine or departing from the principle of the invention as defined in the following claims.

I claim:

1. The method of progressively producing a seam weld which consists in subjecting the work between electrodes to welding pressure and an alternating electric current continuously feeding the work while subjected to such pressure between the electrodes, and repeatedly interrupting the current independently of the frequency of its alternations while the work is subjected to such welding pressure and is being continuously fed between the electrodes.

2. In an electric welding machine the combination of a transformer, welding electrodes connected with the secondary of the transformer, means for subjecting the work between the electrodes to a welding pressure, means for closing the circuit at the beginning and end of a weld, means for continuously feeding the work while subjected to pressure between the electrodes, and automatic means of interrupting the current in the primary of the transformer at predetermined frequent intervals while the work is subjected to pressure and is being continuously fed between the electrodes.

3. In an electric welding machine the combination with welding electrodes one of which is movable toward and from the other, a source of alternating electric current connected with the electrodes; means for operating the movable electrode and subjecting the work between it and the opposing electrode to a predetermined pressure, and automatic means for frequently interrupting the alternating current independently of the frequency of its alternations while the work is being fed and subjected to pressure between the electrodes.

4. In an electric welding machine the combination of electrodes one of which is movable toward and from the other, means for shifting the movable electrode toward or from the opposing electrode at will, automatic means adapted to close the circuit through the electrodes when one is moved toward the other and to break the circuit when they are separated, and automatic means for interrupting the current at predetermined frequent intervals while the machine is in operation.

5. In an electric welding machine the combination of a transformer, welding electrodes connected with the secondary of the transformer, means for forcing one of said electrodes toward the other to press the work between them, and a current interrupter consisting of normally closed contact pieces in the primary of the transformer, and automatic means for temporarily separating said contact pieces at frequent intervals while the machine is in operation.

6. In an electric welding machine the combination of a transformer having an extra secondary conductor, welding electrodes connected with the terminals of the main secondary of the transformer, means for forcing one of said electrodes toward the other to press the work between them, and a current interrupter consisting of normally closed contact pieces in the primary of the transformer one of which is movable, and a magnet coil connected with the extra secondary of the transformer and adapted when current is supplied to the transformer to momentarily separate said contact pieces and interrupt the welding current at frequent intervals.

7. In an electric welding machine the combination of a transformer comprising a core and an extra secondary, welding electrodes connected with the main secondary of the transformer, means for forcing one of said electrodes toward the other to press the work between them, and an automatic current interrupter comprising contact pieces immersed in liquid and included in the primary of the transformer, one of said contact pieces being movable toward and from the other and having a magnetizable stem, a spring tending to hold said contact pieces in engagement, and a solenoid magnet coil loosely surrounding said stem and connected with the extra secondary of the transformer.

8. In an electric welding machine the combination of a transformer having an annular laminated core, a primary coil encircling a leg of said core, and a secondary conductor comprising a hollow U-shaped metal section embracing a leg of the core and provided with water cooling connections, a stationary electrode connected by a rigid conducting and supporting arm with one limb of said U-shaped section, an electrode connected by a flexible conductor with the other limb of said U-shaped section and movable toward and from the other electrode, and means for forcing the movable electrode toward the stationary electrode to press the work between them.

9. In an electric welding machine the combination with a frame, a vertically movable slide guided in said frame, a rotary disk electrode having a vertical swivel connection with said slide and provided with a worm gear, a spur gear mounted on the frame coaxially with the swivel of the electrode, a shaft mounted parallel with the axis of said swivel and spur gear in bearings pivotally connected with said frame and slide coaxially with said swivel and spur gear, said shaft having a pinion meshing with said spur gear and a longitudinally sliding worm meshing with said worm gear, means of rotating said spur gear, and means for shifting said slide and electrode vertically.

10. In an electric welding machine the combination with welding electrodes of a current interrupter comprising contact pieces normally closing the circuit and immersed in a partial conductor liquid, and means for momentarily and successively separating said contact pieces while the welding electrodes are in operative relation to the work.

11. In an electric welding machine the combination of a current conducting head provided with an insulated journal bearing, a rotary disk electrode having a journal mounted in said bearing, a contact piece movably mounted in the head in engagement with said electrode, and a conductor spring electrically connected with the head and pressing the contact piece against the electrode.

12. The method of producing a seam weld which consists in simultaneously subjecting the work to the heating action of an alternating electric current and to a welding pressure and in repeatedly interrupting the current independently of the frequency of the alternations while the work is subjected to such pressure and is being welded.

13. The process of electric welding which consists in exerting a welding pressure on the materials to be welded and during the continuance of such pressure, passing though such materials a current which varies a plurality of times between a real value and a greater value.

14. The combination with an electric resistance line welding machine, of means for supplying thereto a current which intermittently varies between a real value and a greater value.

15. The method of electric welding which consists in applying the electrodes on opposite sides of the work, causing relative movement between the work and the electrodes while the electrodes are so applied, applying an alternating current through said electrodes, and varying said current between maximum and minimum values, the frequency of such variation being less than the frequency of the alternating current.

16. The method of electric seam-welding sheet-metal which consists of subjecting the work to welding pressure between opposing electrodes, passing an alternating electric welding current through the electrodes and the work, causing relative movement between the work and the electrodes, and repeatedly and rapidly interrupting the welding current independently of the frequency of its alternations while the work is subjected to such welding pressure and the weld is being made over any given area.

17. The method of electric seam-welding sheet-metal which consists in subjecting the work to welding pressure between opposing electrodes, causing continuous relative movement between the work and the electrodes under welding pressure, passing an alternating electric welding current through the electrodes and the work under welding pressure, and repeatedly and rapidly interrupting the welding current independently of the frequency of its alternations while the work is subjected to such welding pressure and relative movement is taking place between the work and the electrodes and while the weld is being made over any given area.

In witness whereof I hereto affix my signature in presence of two witnesses.

CLAIR M. AGNEW.

Witnesses:
 CHAS. L. GOSS,
 GWENDOLYN K. WOLFE.